United States Patent
Rixom et al.

[11] Patent Number: 5,931,610
[45] Date of Patent: Aug. 3, 1999

[54] FIBER DISPENSING SYSTEM

[75] Inventors: Maurice Roger Rixom, Irving, Tex.; Dale A. Ives, Winter Haven, Fla.

[73] Assignee: ARR-MAZ Products, L.P., Winter Haven, Fla.

[21] Appl. No.: 08/858,658

[22] Filed: May 19, 1997

[51] Int. Cl.$^6$ .................................................. B65G 53/66
[52] U.S. Cl. ........................... 406/32; 406/24; 406/52; 406/61; 406/69; 406/135; 222/58; 366/196
[58] Field of Search ........................ 406/22, 24, 32, 406/52, 57, 61, 69, 135; 222/58; 366/194, 195, 196, 292

[56] References Cited

U.S. PATENT DOCUMENTS

| | | | |
|---|---|---|---|
| 2,026,732 | 1/1936 | Farley | 406/65 |
| 2,964,244 | 12/1960 | Pennington | 406/71 |
| 3,099,368 | 7/1963 | Turner et al. | 222/58 |
| 3,481,509 | 12/1969 | Marhauer | 222/58 X |
| 3,618,684 | 11/1971 | Burke et al. | 177/114 |
| 3,708,208 | 1/1973 | Fuss | 406/144 |
| 3,945,619 | 3/1976 | Taibi | 366/18 |
| 4,023,779 | 5/1977 | Beloy | 366/20 |
| 4,054,784 | 10/1977 | Ricciardi et al. | 222/58 X |
| 4,089,439 | 5/1978 | Dearlove et al. | 222/167 |
| 4,134,466 | 1/1979 | Steele | 177/114 |
| 4,172,535 | 10/1979 | Smith | 222/58 |
| 4,269,548 | 5/1981 | von Bennigsen-Mackiewicz et al. | 406/25 |
| 4,524,886 | 6/1985 | Wilson et al. | 222/58 |
| 4,591,012 | 5/1986 | Moran et al. | 177/145 |
| 4,635,819 | 1/1987 | Wilson et al. | 222/58 |
| 4,664,160 | 5/1987 | Rothstein et al. | 141/67 |
| 4,669,887 | 6/1987 | Lee | 366/155.2 |
| 4,953,135 | 8/1990 | Lee | 366/155.2 |
| 5,110,521 | 5/1992 | Moller | 264/40.4 |
| 5,407,139 | 4/1995 | Mleczewski | 241/18 |
| 5,529,247 | 6/1996 | Mleczewski | 241/18 |
| 5,556,237 | 9/1996 | Rexius | 406/32 |
| 5,590,984 | 1/1997 | Assarsson | 406/32 |
| 5,775,852 | 7/1998 | Boutte et al. | 406/32 |

*Primary Examiner*—Andrew C. Pike
*Attorney, Agent, or Firm*—Dennis G. LaPointe; Joseph C. Mason, Jr.

[57] ABSTRACT

A fiber dispensing system for storing and delivering fibrous material includes a housing for receiving and storing the fibrous material and shapes supporting the housing. The housing has an activatable dispensing mechanism for selectively dispensing the fibrous material from the housing. A control mechanism is electrically connected to the dispensing mechanism for receiving an activation signal to activate the dispensing mechanism. A load mechanism including load cells mounted to the straps and electrically connected to the control mechanism measures the weight amount of any fibrous material within the housing and transmits a weight amount data signal to the control mechanism.

11 Claims, 2 Drawing Sheets

FIBER DISPENSING SYSTEM

FIELD OF THE INVENTION

This invention relates, generally, to systems for storing and delivering fibrous material to concrete mixers. More particularly, it relates to systems for storing and delivering fibrous material to concrete mixers which uniformly meter the fibers prior to distribution to the concrete mixers.

BACKGROUND OF THE INVENTION

Synthetic fibrous material or fibers, based on polypropylene, polyester, or nylon, are often added to concrete mixes primarily to improve resistance to cracking, but with other benefits such as enhanced impact resistance, toughness, and impermeability. In fact, the desirability of employing fibrous reinforcing material in concrete has been known for a number of years. The use of synthetic fibers does not replace the traditional steel reinforcement rods but acts as a secondary reinforcement to enhance the properties and integrity of the concrete matrix.

Generally, synthetic fibers are available in two physical forms: monofilament fibers with a round cross section having a diameter of 20 to 50 microns and lengths of one-quarter inch (¼") to one inch (1"), and fibrillated fibers produced by slitting drawn or stretched polymer films and reinterconnected forming a net-like array. The fibrillated fibers are used typically in small bundles and can be one-half inch (½") to two and one-half inches (2½") long with the cross section of each individual fiber being rectangular having dimensions of approximately 40 microns by approximately 300 microns.

In most situations, the fibers are added to the concrete in an amount ranging from one-half pound (½ lb.) to three pounds (3 lb.) or more per cubic yard, depending on the application. For convenience, the fibers are packed in pre-weighed bags of one-half pound (½ lb.) to ten pounds (10 lb.) or more, which can be added directly into a ready-mixed concrete truck. Originally, the bags of fibers were made of plastic which were opened, emptied into the truck, and then discarded. More recently, the fibers have been packaged into paper bags that can be put directly into the concrete mixer. The type of paper used for the bags depends on its ease of degradability in the concrete mix.

There are several disadvantages in adding the preweighed bags, either plastic or paper, of fibers to the ready-mixed concrete trucks. First, the preweighed bags have a low bulk density which equates directly to high freight and storage costs. Second, the actual process of filling the bags is time consuming and costly. Third, the actual cost of the bag itself is significant and provides no useful purpose in the concrete. Fourth, manual placement of the bags into the ready-mixed concrete trucks adds additional time to the process, impedes the flow of traffic at the concrete mixing plant, and increases safety risks for concrete plant employees.

Most recently, automated fiber dispensing systems have been developed in attempts to overcome these disadvantages. For example, automated dispensing systems have been the subject of several patents including U.S. Pat. Nos. 5,529,247 and 5,407,139 to Mleczewski, U.S. Pat. No. 3,618,684 to Burke et al., U.S. Pat. No. 3,099,368 to Turner et al., U.S. Pat. No. 4,591,021 to Moran et al., to name a few.

However, each of these systems has shortcomings. For example, some of these systems are not easily controlled to dispense a given weight of fibers. In addition, these systems do not provide for a means for the steady continuous removal of bulk fibers for addition into the concrete mixer as the stone, sand, cement, and water are added to give complete and automated dispersion of the fibers.

In view of the prior art at the time the present invention was made, it was not obvious to those of ordinary skill in the pertinent art how the needed automated fiber dispensing system could be provided.

SUMMARY OF THE INVENTION

The long-standing but heretofore unfulfilled need for an improved fiber dispensing system is now met by a fiber dispensing system which has a housing for receiving and storing a weight amount of a fibrous material. The housing has an activatable dispensing means for selectively dispensing the fibrous material from the housing. A fiber receiving chamber is in open communication with the housing for receiving the fibrous material from the dispensing means. A control means is electrically or pneumatically operatively connected to the dispensing means and receives an activation signal to activate the dispensing means. A load means is associated with the housing and electrically connected to the control means for measuring the weight amount of any fibrous material within the housing and transmitting a weight amount data signal to the control means. A delivery means is electrically connected to the control means for delivering fiber from the fiber receiving chamber to a receptacle. Upon the control means receiving the activation signal and activating the dispensing means, the dispensing means commences dispensing a predetermined weight amount of the fibrous material from the housing into the receiving chamber until the weight amount data signal indicates that the predetermined weight amount of the fibrous material has been dispensed from the housing. The control means then automatically deactivates the dispensing means arresting the flow of the fibrous material from the housing.

The fiber dispensing system of the present invention comprises a frame for supporting the housing by a plurality of support straps. Preferably, the housing comprises a hopper defining a chamber with the hopper having an inlet for receiving the fibrous material into the chamber and an outlet for dispersing the fibrous material from the chamber. Furthermore, preferably, the load means comprise at least one load cell mounted to at least one of the support straps.

The control means of the fiber dispensing system of the present invention comprises a microprocessor-based controller which can be activated by remote control. Additionally, the dispensing means comprises a first and second motor and a crank shaft having an inner shaft, a middle shaft, and an outer shaft. Each of the inner shaft, middle shaft, and outer shaft have a first end and a second end. The first end of the inner shaft is rotatably mounted to the first motor and the second end of the inner shaft extends into the housing. A universal joint is mounted to the second end of the inner shaft. An axle having a first end and a second end is provided, with the first end of the axle rotatably mounted to the universal joint such that the axle rotates upon rotation of the inner shaft. The first end of the middle shaft is rotatably mounted to the second motor. The second end of the middle shaft extends into the housing and is connected to the first end of the axle. A guide wheel is rotatably mounted to the second end of the axle such that the guide wheel is forced along an inner surface of the housing upon rotation of the middle shaft. A plurality of helically aligned fingers substantially along the length of the axle travel though the fibrous material within the housing upon rotation of the inner and middle shafts. An outlet for dispensing the fibrous material from the housing is provided. The first end of the outer shaft is rotatably mounted to the first motor and the second end of the outer shaft extends into the housing. A propeller assembly is mounted to the second end of the outer shaft for directing the fibrous material through the outlet. The delivery means of the present invention includes a blower mechanism for moving air through the fiber receiving chamber and entraining the fibrous material in the air. A flexible tube is mounted to the fiber receiving chamber and directs the air entrained fibrous material to a receptacle such as a ready-mixed concrete truck.

The present invention further includes a method for storing and delivering fibrous material. The method of the present invention comprises receiving and storing the fibrous material in a housing with the housing having an activatable dispensing means for selectively dispensing the fibrous material from the housing. A weight amount of the fibrous material within the housing is measured and the dispensing means is activated. A predetermined weight amount of the fibrous material is dispensed from the housing.

A control means is electrically or pneumatically operatively connected to the dispensing means for receiving an activation signal to activate the dispensing means. A load means is associated with the housing and electrically connected to the control means for measuring the weight amount of any fibrous material within the housing and for transmitting a weight amount data signal to the control means.

The housing is supported by a plurality of support straps. In addition, preferably, the control means comprises a microprocessor-based controller and can be activated by remote control.

The fibrous material within the housing means is propelled from the housing and entrained in air for delivery to a receptacle.

The invention accordingly comprises the features of construction, combination of elements, and arrangement of parts that will be exemplified in the construction hereinafter set forth, and the scope of the invention will be indicated in the claims.

BRIEF DESCRIPTION OF THE DRAWINGS

For a fuller understanding of the present invention, reference should be made to the following detailed description, taken in connection with the accompanying drawings, in which.

DETAILED DESCRIPTION OF THE INVENTION

Figure 1:
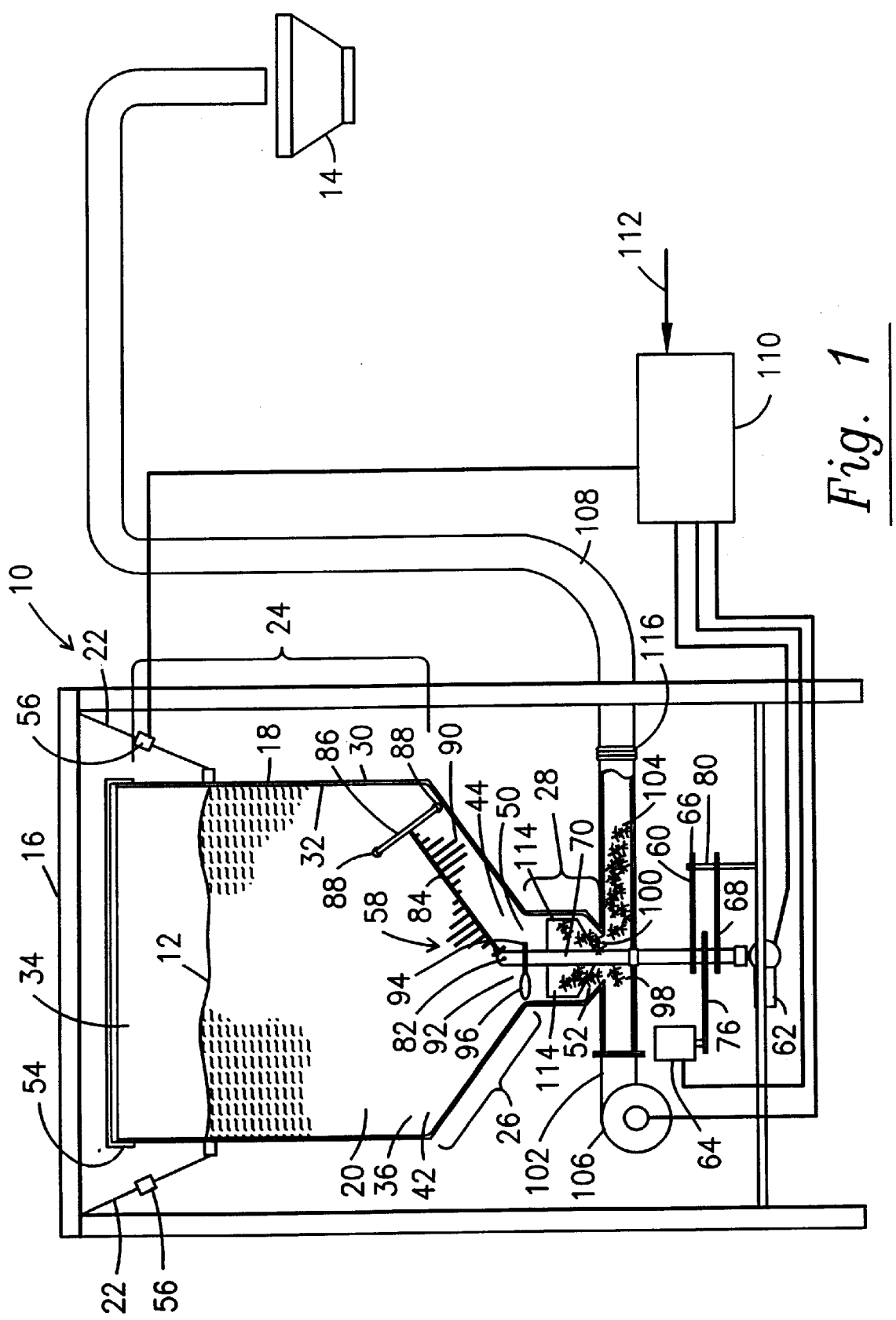
FIG. 1 is a side elevational partly sectional view of the fiber dispensing system according to the present invention.
Figure 2:
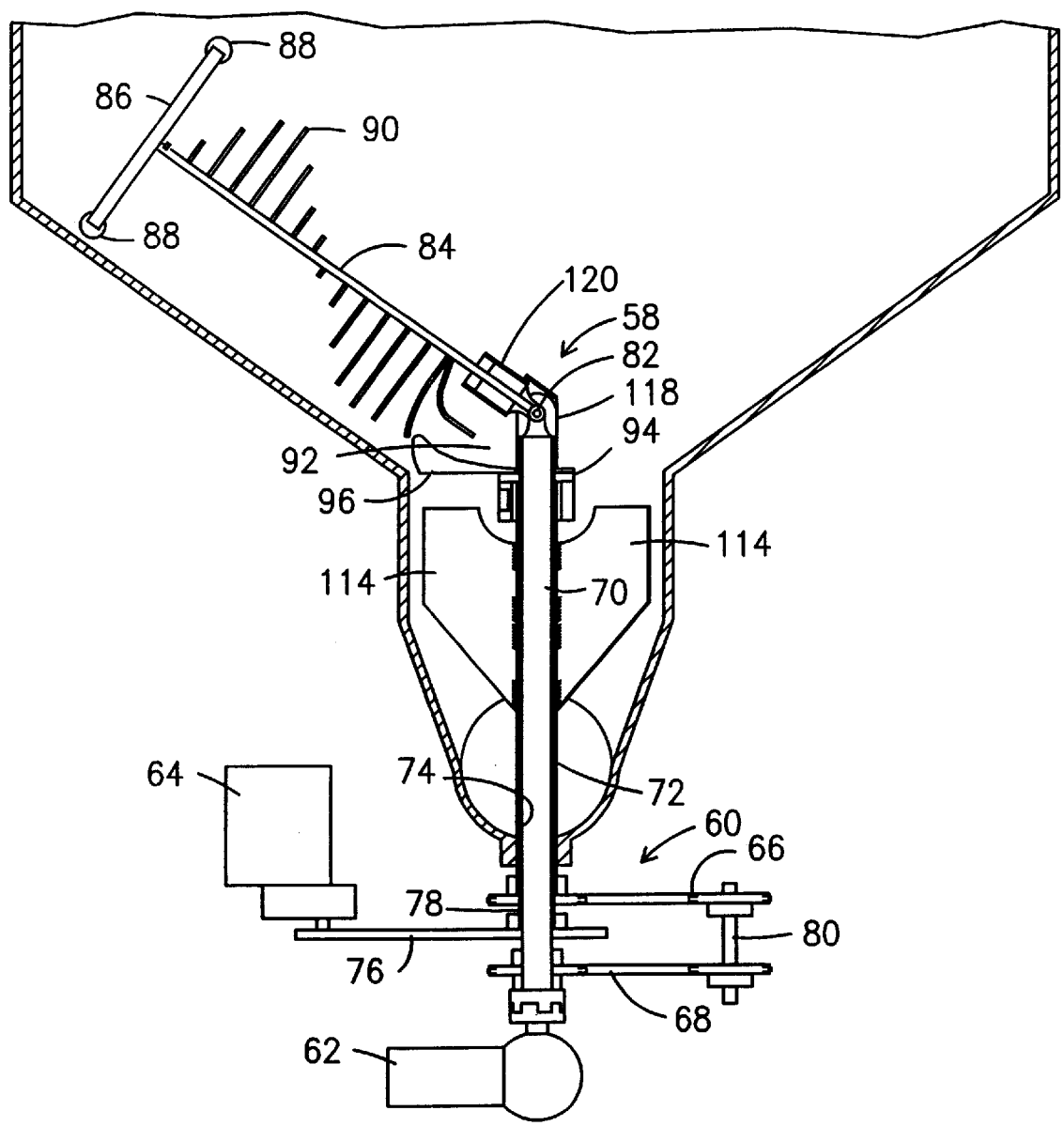
FIG. 2 is an exploded partly sectional view of a portion of FIG. 1.

Referring now to the drawings, in which like numerals refer to like elements thereof, FIG. 1 and FIG. 2, show the novel fiber dispensing system of the present invention which is denoted as a whole by the reference numeral 10. The fiber dispensing system 10 stores and delivers fibrous material or fibers 12 to concrete mixers, such as ready-mixed concrete trucks 14, for instance, to form a fibrous mix of fiber reinforced concrete. The fiber dispensing system 10 of the present invention is based on the delivery and storage of the fibers 12 in bulk, the weighing of the required quantity of fibers, and the automatic transfer to the ready-mixed concrete trucks. The fibers 12 for use in the present invention are preferably synthetic fibers, i.e., polypropylene, polyester, or nylon. It is within the scope of the present invention, however, to have fibers 12 formed from other materials.

The fiber dispensing system 10 comprises a frame 16 and a housing 18 defining a chamber 20 for storing and distributing the fibers 12. The housing 18 is supported within the frame 16 by a plurality of support straps or belts 22. The housing 18 comprises a substantially cylindrical storage portion 24, a substantially conical portion 26, and a substantially cylindrical extension portion 28 and has an outer surface 30 and an inner surface 32. The storage portion 24 has a substantially circular open first storage end 34 and a substantially circular open second storage end 36 with the open first storage end 34 having a diameter approximately equal to the diameter of the open second storage end 36. The conical portion 26 has a substantially circular open first conical end 42 and a substantially circular open second conical end 44 with the diameter of the open first conical end 42 approximately equal to the diameter of the open second storage end 36 and the diameter of the open second conical end 44 being less than the diameter of the open first conical end 42. The extension portion 28 has a substantially circular open first extension end 50 and a substantially circular open second extension end 52 with the diameter of the open first extension end 50 approximately equal to the diameter of the open second conical end 44 and the diameter of the open second extension end 52 approximately equal to the diameter of the open first extension end 50. As shown in FIG. 1, the open second extension end may be conical. While the first ends 34, 42, 50 and the second ends 36, 44, 52 of the storage portion 24, the conical portion 26, and the extension portion 28, respectively, have been described as being substantially circular, it should be noted that it is within the scope of the present invention for the first ends 34, 42, 50 and the second ends 36, 44, 52 of the storage portion 24, the conical portion 26, and the extension portion 28, respectively, to be oval, square, rectangular, or any convenient shape known in the art. Furthermore, while the storage portion 24 and the extension portion 28 have been described as being substantially cylindrical, it is within the scope of the present invention for the storage portion 24 and the extension portion 28 to be tubular having three or more sides or any other shape known in the art.

The open first conical end 42 of the conical portion is mounted to the open second storage end 36 of the storage portion 24 and the open first extension end 50 is mounted to the open second conical portion end 44 by welding, nuts and bolts, screws, or other conventional attachment means. In addition, it is contemplated that the housing 18 may be integrally molded. Furthermore, the inner surface of the housing 18 is substantially smooth inhibiting any fibers 12 from clinging to the inner surface 32 of the housing 18. Housing 18 may be any hopper device, i.e., any funnel-shaped receptacle for delivering fibrous material known in the art. As is known in the art, the hopper defines a chamber which has an inlet for receiving the fibrous material into the chamber and an outlet for dispensing the fibrous material from the chamber.

The housing 18 has a removable lid 54 sealingly mounted about the open first end 34 of the storage portion 24 thereby protecting the fibers 12 stored within the chamber 20 of the housing 18 from the introduction of foreign material including dust, liquid, and other particulate. When necessary, the chamber 20 of the housing 18 is loadable with fiber 12 through the open first end 34 by removing lid 54 of the storage portion 24 for storage of the fibers 12 within the chamber 20 of the housing 18 and distribution into ready-mixed concrete trucks 14. Actual storage and distribution of the fibers 12 within and from the chamber 20 of the housing 18 will be discussed in greater detail below.

The fiber dispensing system 10 includes at least one load cell 56 mounted to the support belts 22 for weighing the housing 18 and the fibers 12 within the chamber 20. Actual function and operation of the load cells 56 in relation to the housing 18 and the fibers 12 therein will also be discussed in greater detail below.

As illustrated in FIG. 1 and shown in greater detail in FIG. 2, the fiber dispenser system 10 of the present invention has a dispensing means 58 for dispensing the fibers 12 stored within the chamber 20 of the housing 18. The dispensing means 58 has a drive mechanism 60 which includes gear motors 62 and 64. Any gear motor known in the art can be used in the present invention. The drive mechanism 60 also includes chain drives 66 and 68 and a crank shaft 70, which has three concentric shafts, outer shaft 72, inner shaft 74, and middle shaft 78. The drive mechanism 60 also includes an idler jack shaft 80 and a cogged belt 76. The inner shaft 74 is driven by gear motor 62 which is connected via a universal joint 82 to an axle 84. The middle shaft 78 is driven by gear motor 64 via the cogged belt 76 which drives tube 118 which has a hinged extension 120 which forces the guide wheel 86 of the revolving axle 84 slowly around the inner surface 32 of the conical portion 26 of the housing 18. The outer shaft 72 is also driven by gear motor 62 via an idler shaft 80 which drives members 114 and a propeller 96.

The crank shaft 70 extends from the motor 62 and through the extension portion 28 into the conical portion 26 of the housing 18, and the universal joint 82 is rotatably connected to the crank shaft 70 and positioned within the conical portion 26 of the housing 18. The motors 62 and 64 are preferably, but not limited to, low-speed motors mounted to the frame 16 or otherwise suitably mounted adjacent the housing 18 in a known manner. While being described as mounted to the frame 16 adjacent the housing 18, the motors 62 and 64 of the dispensing means 58 of the fiber dispensing system 10 of the present invention can also be positioned apart from the frame 16 so long as the motors 62 and 64 can drive the crank shaft 70 positioned within the housing 18 of the fiber dispensing system 10.

The dispensing means 58 of the fiber dispensing system 10 also includes the axle 84 connected to the universal joint 82 for rotation with the universal joint 82. The middle shaft 78 of crank shaft 70 drives tube 118 which forces the guide wheel 86 mounted to the axle 84 to travel along the inner surface 32 of the conical portion 26 of the housing 18. As described, the guide wheel 86 travels along the inner surface 32 of the conical portion 26 of the housing 18 and preferably has a rubber rim 88 about the circumference of the guide wheel 86 allowing the guide wheel 86 to smoothly travel along the inner surface 32 and inhibiting wear on the inner surface 32 of the conical portion 26 of the housing 18.

The dispensing means 58 of the fiber dispensing system 10 further has a plurality of fingers 90 extending from the axle 84. The fingers 90 extend from the axle 84 along the length of the axle 84 between the universal joint 82 and the guide wheel 86. As the axle 84 rotates by rotation of the universal joint 82, the fingers 90 travel through the fibers 12 in the chamber 20 causing the fibers 12 to be removed from the chamber 20 in a steady stream. Specifically, the axle 84 with fingers 90 gently trickles the fibers in their original form, i.e., in bundles of fibers down into the cylindrical extension portion 28 where they are then blown towards the mixer 14. Preferably, the fingers 90 are positioned in a helical or spiral manner along the axle 84.

The dispensing means 58 of the fiber dispensing system 10 further includes a propeller mechanism 92 having a connection element 94 and a blade portion 96. The connection element 94 is mounted to the outer shaft 72 of crank shaft 70 between the motor 62 and the universal joint 82 such that the propeller mechanism 94 is positioned substantially within the extension portion 28 with the blade portion 96 extending substantially perpendicular to the crank shaft 70. The blade portion 96 of the propeller mechanism 92 preferably extends from the crank shaft 70 to a point nearingly adjacent the inner surface 32 of the extension portion 28 of the housing 18. The propeller mechanism 92 effectively moves the fibers 12 from the chamber 20 of the housing 18 and through the open second extension end 52 of the extension portion 28 as will be described in further detail below.

The fiber dispensing system 10 further includes a fiber receiving chamber 98 for receiving fibers 12 from the chamber 20 of the housing 18 through the open second extension end 52 of the extension portion 28. The fiber receiving chamber 98 has a substantially circular receiving opening 100, a substantially circular blower assembly opening 102 adjacent the receiving opening 100, and a substantially circular exhaust portion 104 substantially opposite the blower assembly opening 102. The receiving opening 100 has a diameter substantially equal to the diameter of the open second extension opening 52 and is preferably mounted to the open second extension end 52 by welding, nuts and bolts, screws, or other conventional means. While the receiving opening 100, the blower assembly opening 102, and the exhaust portion 104 have been described as being substantially circular, it should be noted that it is within the scope of the present invention for the receiving opening 100, the blower assembly opening 102, and the exhaust portion 104 to be, but not limited to, oval, square, rectangular, or any shape known in the art.

The fiber dispensing system 10 also has a blower assembly 106 mounted to the blower assembly opening 102 and a flexible tube 108 mounted to the exhaust portion 104. The blower assembly 106 moves a certain volume of air into the fiber receiving chamber 98 and effectively entrains the fibers 12 in the moving air and moves the air with the fibers 12 entrained therein through the fiber receiving chamber 98 and especially the exhaust portion 104. The moving air and the entrained fibers 12 are moved out through the exhaust portion 104 and into the flexible tube 108. The flexible tube 108 is preferably constructed from a material such as reinforced rubber and extendible to the ready-mixed concrete truck 14 or other receptacle. In a preferred embodiment, flexible tube 108 has one or more flexible joints 116 along its length, while in a most preferred embodiment flexible joint 116 is located between the exhaust portion 104 and the flexible tube 108. The flexible joint 116 may be a bellows or made from any other low resistance material provided that the effect on the load cells 56 is minimized.

The fiber dispensing system 10 of the present invention has a microprocessor-based controller 110 electrically connected to the load cells 56 to receive weight data, and is further electrically connected to the blower assembly 106 and the motors 62 and 64 to control the function of the blower assembly 106 and the motors 62 and 64, respectively. The microprocessor-based controller 110 is programmed to control the load cells 56, the blower assembly 106, and motors 62 and 64 of the fiber dispensing system 10 to perform the specific functions of the load cells 56, the blower assembly 106, and the motors 62 and 64.

The operation of the fiber dispensing system 10 of the present invention will now be described. Briefly, upon receipt of the signal 112 from the ready-mixed concrete plant, the control unit 110 activates the blower assembly 106 and both motors 62 and 64 of the drive mechanism 60. The axle 84 is caused to rotate about its own axis via gear motor 62 which is connected to the inner shaft 74 of crank shaft 70. While rotating about its own axis, axle 84 is driven via gear motor 64 and the cogged belt 76 around the inner circumference of the chamber 20 which causes helical fingers 90 attached to axle 84 to move the fiber bundles gently toward the propeller blade 96 which pushes the fibers into the receiving chamber 98. Members 114 assist in maintaining a uniform flow of fibers. A stream of air that is flowing through the chamber 98 carries the fibers 12 through the exhaust portion 104 into the tubing 108 to the receptacle 14. When the required amount of fibers 12 has been indicated by the load cells 56, the controller 110 stops the drive mechanism 60, which in turn stops the flow of fibers. After a period of time sufficient to purge the tube 108, the controller 110 turns off the blower mechanism 106. As the lower portion of chamber 20 empties, the fibers 12 from the upper portion of chamber 20 fall down to fill the void.

The load cell 56 continuously measures the weight amount of the fibers 12 within the chamber 20 and transmits a weight amount data signal to the controller 110. An operator of the ready-mixed concrete plant enters the required or desired parameters into the controller 110 via remote or local signal 112, the parameters containing certain information such as the desired batch size. On receipt of the signal 112 from the ready-mixed concrete plant, the controller 110 activates the motors 62 and 64 and the blower assembly 106. The motors 62 and 64 cause the axle 84 through the crank shaft 70 and the universal joint 82 to rotate upon its own axis and to be driven around the inner circumference of chamber 20 of the housing 18 in a substantially circular manner due mounted guide wheel 86. The rotation of the axle 84 and circular motion of guide wheel 86 causes the helically aligned fingers 90 to gently pull the fibers 12 from the chamber 20. The propeller blade portion 96 of the propeller mechanism 92 pushes the fibers 12 into the fiber receiving chamber 98. The stream of air generated by the blowing assembly 106 flowing through the fiber receiving chamber 98 entrains and carries the fibers 12 through the exhaust portion 104 of the fiber receiving chamber 98 into the flexible tube 108 and to the ready-mixed concrete truck 14. When the weight amount data signal transmitted from the load cell 56 indicates that the predetermined weight amount of the fibers 12 has been dispensed from the chamber 20 of the housing 18, the controller 110 automatically arrests the flow of the fibers 12 from the housing 18 by stopping the motors 62 and 64. After a predetermined period of time elapses sufficient to purge the flexible tube 108 of fibers 12, the controller 110 turns off the blower assembly 106. As the fibers 12 within the conical portion 26 of the housing 18 empties, the fibers 12 in the storage portion 24 of the housing 18 fall via gravity to fill the conical portion 26 for use at a later time.

The fiber dispensing device 10 of the present invention provides an intermittent supply of fibers 12 to a ready-mixed concrete truck 14 as desired. The chamber 20 of the housing 18 can be refilled with fibers 12 by removing the lid 54 and inserting the fibers 12 into the chamber 20. The load cell 56 will continue to transmit the new weight amount to the controller 110 for future fiber dispensing.

It will thus be seen that the objects set forth above, and those made apparent from the foregoing description, are efficiently attained and since certain changes may be made in the foregoing construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A fiber dispensing system comprising:
   a housing for receiving and storing a weight amount of a fibrous material;
   activatable dispensing means for selectively dispensing the fibrous material from the housing;
   a fibrous material receiving chamber in open communication with the housing for receiving the fibrous material from the dispensing means;
   control means operatively connected to the dispensing means for receiving an activation signal to activate the dispensing means;
   load means associated with the housing and electrically connected to the control means for measuring the weight amount of the fibrous material within the housing and for transmitting a weight amount data signal to the control means;
   a plurality of support straps supporting the housing, wherein the load means comprises at least one load cell mounted to at least one of the support straps; and
   delivery means electrically connected to the control means for delivering the fibrous material from the fibrous material receiving chamber to a receptacle.

2. The system as claimed in claim 1 wherein the dispensing means comprises:
   a first motor and a second motor;
   a crank shaft having an inner shaft, a middle shaft, and an outer shaft;
   the inner shaft having a first end and a second end, the first end of the inner shaft being rotatably mounted to the first motor, the second end of the inner shaft extending into the housing;
   a universal joint mounted to the second end of the inner shaft;
   an axle having a first end and a second end, the first end of the axle being rotatably mounted to the universal joint such that the axle rotates upon rotation of the inner shaft;
   the middle shaft having a first end and a second end, the first end of the middle shaft being rotatably mounted to the second motor, the second end of the middle shaft extending into the housing and connecting to the first end of the axle;
   a guide wheel rotatably mounted to the second end of the axle, the guide wheel being forced along an inner surface of the housing upon rotation of the middle shaft;
   a plurality of helically aligned fingers substantially along a length of the axle, the fingers traveling though the fibrous material within the housing upon the rotation of the inner and middle shafts;

the outer shaft having a first end and a second end, the first end of the outer shaft being rotatably mounted to the first motor, the second end of the outer shaft extending into the housing;

an outlet for dispensing the fibrous material from the housing; and a propeller assembly mounted on the second end of the outer shaft for directing the fibrous material through the outlet.

3. The system as claimed in claim 2 further comprising a resilient rim about a circumference of the guide wheel.

4. A fiber dispensing system comprising:

a housing for receiving and storing a weight amount of a fibrous material;

activatable dispensing means for selectively dispensing the fibrous material from the housing, the activatable dispensing means including a first motor and a second motor, a crank shaft having an inner shaft, a middle shaft, and an outer shaft, the inner shaft having a first end and a second end, the first end of the inner shaft being rotatably mounted to the first motor, the second end of the inner shaft extending into the housing, a universal joint mounted to the second end of the inner shaft, an axle having a first end and a second end, the first end of the axle being rotatably mounted to the universal joint such that the axle rotates upon rotation of the inner shaft, the middle shaft having a first end and a second end, the first end of the middle shaft being rotatably mounted to the second motor, the second end of the middle shaft extending into the housing and connecting to the first end of the axle, a guide wheel rotatably mounted to the second end of the axle, the guide wheel being forced along an inner surface of the housing upon rotation of the middle shaft, a plurality of helically aligned fingers substantially along a length of the axle, the fingers traveling though the fibrous material within the housing upon the rotation of the inner and middle shafts, the outer shaft having a first end and a second end, the first end of the outer shaft being rotatably mounted to the first motor, the second end of the outer shaft extending into the housing, an outlet for dispensing the fibrous material from the housing, and a propeller assembly mounted on the second end of the outer shaft for directing the fibrous material through the outlet;

a fibrous material receiving chamber in open communication with the housing for receiving the fibrous material from the dispensing means;

control means operatively connected to the dispensing means for receiving an activation signal to activate the dispensing means;

load means associated with the housing and electrically connected to the control means for measuring the weight amount of the fibrous material within the housing and for transmitting a weight amount data signal to the control means; and delivery means electrically connected to the control means for delivering the fibrous material from the fibrous material receiving chamber to a receptacle.

5. The system as claimed in claim 4 further comprising a plurality of support straps supporting the housing, wherein the load means comprises at least one load cell mounted to at least one of the support straps.

6. The system as claimed in claim 1 or claim 4 further comprising a frame for supporting the housing.

7. The system as claimed in claim 1 or claim 4 wherein the housing comprises a hopper defining a chamber, the hopper having an inlet for receiving the fibrous material into the hopper chamber and an outlet for dispersing the fibrous material from the hopper chamber.

8. The system as claimed in claim 1 or claim 4 wherein the control means comprises a microprocessor-based controller.

9. The system as claimed in claim 1 or claim 4 wherein the control means is activated by remote control.

10. The system as claimed in claim 1 or claim 4 further comprising a blower mechanism for moving air through the fibrous material receiving chamber and entraining the fibrous material in the air through a flexible tube mounted to the fibrous material receiving chamber for directing the air entrained fibrous material to the receptacle.

11. The system as claimed in claim 1 or claim 4 wherein the receptacle is a ready-mixed concrete truck.

* * * * *